US012249862B2

(12) United States Patent
Parobek et al.

(10) Patent No.: US 12,249,862 B2
(45) Date of Patent: Mar. 11, 2025

(54) RESISTOR-FREE SUPERCAPACITOR MOBILE DEVICE POWERING LAYOUT

(71) Applicants: Lubomir Parobek, San Jose, CA (US); Steven Swanson, Castro Valley, CA (US)

(72) Inventors: Lubomir Parobek, San Jose, CA (US); Steven Swanson, Castro Valley, CA (US)

( * ) Notice: Subject to any disclaimer, the term of this patent is extended or adjusted under 35 U.S.C. 154(b) by 686 days.

(21) Appl. No.: 17/571,464

(22) Filed: Jan. 8, 2022

(65) Prior Publication Data

US 2023/0223783 A1 Jul. 13, 2023

(51) Int. Cl.
H02J 7/34 (2006.01)
H01M 10/44 (2006.01)
H01M 10/46 (2006.01)
H02J 7/00 (2006.01)

(52) U.S. Cl.
CPC ............ *H02J 7/345* (2013.01); *H01M 10/44* (2013.01); *H01M 10/46* (2013.01); *H02J 7/0031* (2013.01); *H02J 7/0049* (2020.01); *H02J 7/00712* (2020.01); *H01M 2220/30* (2013.01); *H02J 2310/22* (2020.01)

(58) Field of Classification Search
CPC ...................................... H02J 7/345
USPC ........................................ 320/138
See application file for complete search history.

(56) References Cited

U.S. PATENT DOCUMENTS

| 8,482,263 | B2* | 7/2013 | Barrade ................. | H02J 7/342 320/167 |
|---|---|---|---|---|
| 8,610,404 | B2 | 12/2013 | Reefman et al. | |
| 9,774,201 | B2 | 9/2017 | Voller et al. | |
| 10,333,319 | B2 | 6/2019 | Sepe, Jr. et al. | |
| 10,931,136 | B2 | 2/2021 | Voller et al. | |
| 2004/0004462 | A1* | 1/2004 | Bean ....................... | H02J 7/345 320/128 |
| 2013/0049676 | A1* | 2/2013 | Ishikawa ................ | B60L 53/53 320/103 |
| 2015/0288206 | A1 | 10/2015 | Aranov et al. | |
| 2019/0070421 | A1 | 3/2019 | Chen | |
| 2021/0203175 | A1 | 7/2021 | Ho et al. | |

* cited by examiner

*Primary Examiner* — Jerry D Robbins
(74) *Attorney, Agent, or Firm* — Verrill Dana, LLP (57) ABSTRACT

An arrangement for powering a mobile device with a fast charge discharge power source such as a supercapacitor without reliance on resistors to protect device electronics from comparatively high supercapacitor current discharge rates. The arrangement protects device electronics by coordinating a switch with a charge controller to balance recharge of a battery electronically coupled to the supercapacitor. The arrangement and techniques utilized result in a substantially continuous trickle charging of the battery from the supercapacitor. In this way, the battery is continuously charged so long as the supercapacitor holds power and the battery remains the safe medium through which device electronics are powered.

20 Claims, 6 Drawing Sheets

RESISTOR-FREE SUPERCAPACITOR MOBILE DEVICE POWERING LAYOUT

BACKGROUND

Electronic devices are increasingly becoming more and more mobile in nature. This has probably been most evident with the public shift from conventional house phones to the advent of mobile phones and now modern smartphones. However, other types of mobile devices such as smart watches, Bluetooth earpieces, tablets, laptops and other electronics are designed with the understanding that regular, long term mobile use may be desired. As a result, design focus on issues such as sizing, ergonomics and battery capacity may be just as important as performance focus for any given modern mobile device.

In the keeping with the example of the smartphone and battery capacity, typical battery life may be about 8-10 hours for a fully charged device. This would be for a device of standard form factor sizing utilizing a standard lithium-ion battery by way of example. Of course, larger sizing or lower performing device types and different battery types may be variables as well. Regardless, as a general rule, the charge rate for any of these device battery combinations is relatively slow. For example, if the battery is fully depleted, it may take a few hours to attain a full charge. In theory, a battery would be able to charge at a much faster rate. However, resistors or charge controllers are required to prevent the battery from overheating and to prevent large discharge current from damaging electronics. The result is a much lower rate of charge.

As a practical matter, given the above parameters of smartphones and battery life, a typical user might plug in a depleted smartphone in the evening, awaken to a fully charged device in the morning and then periodically continue to recharge the device throughout the next day. Of course, this depends on the user's degree of use and the remaining recharge life of the battery (i.e., the age of the battery in terms of number of charge cycles). Charging locations are often found in a user's vehicle, near a desk at work and other locations common to daily modern life. However, keeping the device plugged in or immobilized on a charge pad detracts from the objective of the device being mobile in the first place. By the same token, a user travelling by air or in a foreign location may not have ready recharge locations. Such a user may not have the option of frequent recharge throughout the day or may utilize a cumbersome external battery, again, detracting from the intended full mobility of the device to some extent.

The above-described mobile device battery issue is twofold. Firstly, users seek longer lasting batteries within current form-factor sizing. So, for example, with this objective met, the user would not need to recharge the battery throughout the day as frequently. Thus, whether travelling on a daily commute to work or across country, the need for recharge may be minimal, if any. Secondly, users seek to meet the objective of quicker recharge of the battery. Thus, continuing with the same types of examples, even if travelling by a redeye flight, the user might attain a complete recharge in a cab ride over to the hotel without the need of carrying an external battery or waiting overnight for recharge at the hotel.

The above-noted objectives of longer lasting and faster recharge mobile device batteries remain substantially unmet. However, certain proposals have been suggested. Notably, it has been suggested that fast charging and discharging power sources or "supercapacitors" might be utilized to power mobile devices such as smartphones. These high power density sources are common in industrial fields, the recharging of hybrid vehicles and other larger scale applications. However, smaller versions that might fit handheld mobile devices do not exist yet.

Unfortunately, the discharge rate of a supercapacitor is so fast that it would be prone to damage electronics of a mobile device such as a smartphone. That is, while the supercapacitor could be recharged in a matter of moments, perhaps less than a minute, the discharge rate may also be incredibly fast, potentially damaging to smartphone electronics. Furthermore, solving this issue through use of resistors only serves to consume energy that might otherwise be available to power the electronics of the smartphone. Thus, the result would be to further deplete an already more quickly depleting power source for the sake of gaining a quicker charge without ever addressing a manner of extending battery life. Therefore, as a practical matter, supercapacitor smartphone powering is not utilized.

SUMMARY

Methods of powering and recharging a mobile device are detailed. The methods may include directing power from an external power source to a fast charging and discharging power source of the device (such as a supercapacitor or solid state battery). Power may then be routed from the fast charging and discharging power source to a rechargeable battery of the device in a resistor-free manner. Of particular note, the routing to the rechargeable battery may employ a switch to prohibit the routing when the battery is less than fully charged and to allow the routing when the battery is fully charged. Further, this routing to the rechargeable battery may also employ a charge controller to keep the power to the battery fully charged.

BRIEF DESCRIPTION OF THE DRAWINGS

Implementations of various structure and techniques will hereafter be described with reference to the accompanying drawings. It should be understood, however, that these drawings are illustrative and not meant to limit the scope of claimed embodiments.

DETAILED DESCRIPTION

Embodiments are described with reference to a particular resistor-free supercapacitor mobile device layout. Specifically, the embodiments depict a smartphone with a particular powering architecture or arrangement. However, other layouts and mobile device types may be possible that take advantage of the embodiments detailed herein. For example, smart watches, Bluetooth earpieces, tablets, sensors, alarms, laptops and other electronic devices may be utilized with such powering layouts. Regardless, so long as the layout allows for a resistor-free approach to managing electronic powering through a supercapacitor in an effective and controlled manner, appreciable benefit may be realized. Also, it should be noted that throughout the specification, a supercapacitor is referenced. However, the layout and techniques detailed herein may be facilitated by any fast charge and discharge power source, and are not limited to supercapacitors. For example, a solid state battery form of fast charge and discharge power source may be utilized in place of a supercapacitor.

Figure 1:
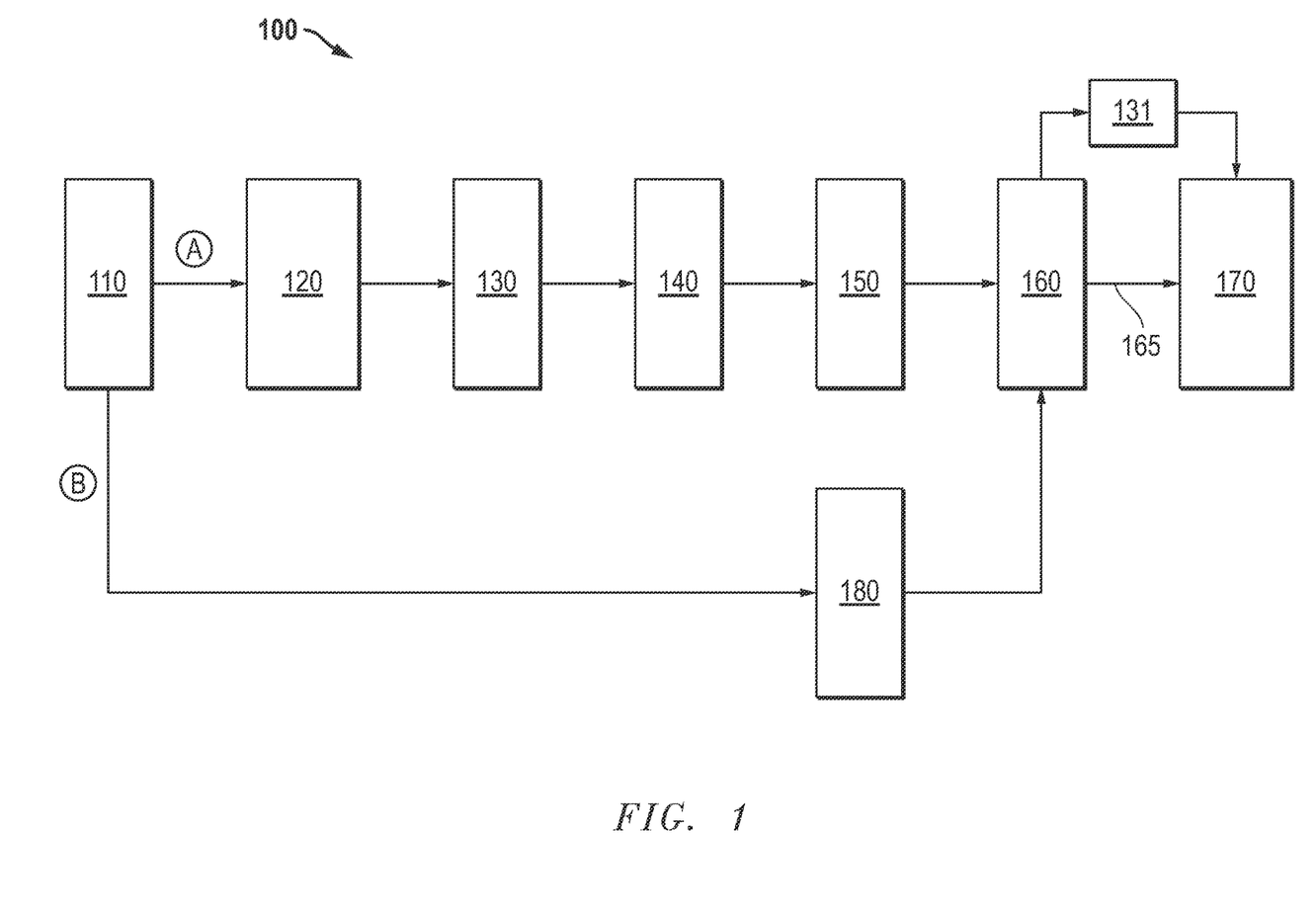
FIG. 1 is a schematic block diagram of an embodiment of mobile device powering architecture that allows for efficient utilization of a supercapacitor.

Referring now to FIG. 1, a schematic block diagram of an embodiment of mobile device powering architecture 100 is shown that allows for efficient utilization of a supercapacitor 120 (i.e. fast charge and discharge power source). Specifically, in spite of the potential for a large discharge rate that typically accompanies a supercapacitor 120, the supercapacitor 120 is utilized without any intervening resistors between the supercapacitor 120 and powered electronics 170. It is in this sense that the arrangement 100 is referred to as "resistor-free". That is, resistors may be utilized in a general sense (e.g. 250, 265 of FIG. 2). However, they are not utilized in a manner that might affect supercapacitor 120 performance. More specifically, they are not utilized in the transfer of power from the supercapacitor 120 to the battery 160.

Instead of utilizing resistors as a safeguard to electronics from the supercapacitor 120 which may operate at 12 volts with a high discharge rate, the arrangement 100 itself provides a layout that serves as a safeguard to device electronics 170. For example, the supercapacitor 120 does not directly power device electronics 170. Instead, power is routed through a rechargeable battery 160. More specifically, in the embodiment shown, an external power source 110, such as a conventional 110 or 220 voltage wall outlet (e.g. see FIG. 3) is used to power the supercapacitor 120 along a first route "A" as depicted. Continuing along this first route "A", power is not immediately directed to device electronics 170 but through a series of other components as described below. Notably, as suggested above, a battery 160 is utilized as the medium through which device electronics 170 are ultimately powered.

Continuing with reference to FIG. 1 and the first or primary route A, the supercapacitor 120 may attain a charge rather quickly and then route power toward the battery 160 as indicated above. In the embodiment shown, an intervening DC-DC converter 140 is found in the path of the route A. More notably, however, a switch 130 and a primary charge controller 150 are also found along the route A. The switch 130, being in communication with the battery 160, makes the regular determination as to whether or not to allow trickle charging of the battery 160 in the first place. So, for example, where the battery 160 is fully charged, the switch 130 may allow for a trickle charging of the battery 160. That is, unlike a drained battery, a fully charged battery 160 may attain power from a supercapacitor 120 without undue concern over overheating or other harmful effects. Thus, a trickling of power to the battery 160, matching the rate of power from the battery 160 to device electronics 170, may safely and effectively take place in spite of the resistor-free layout as described above.

Alternatively, the primary charge controller 150 also monitors the charge level of the battery 160. So, for example, when the battery 160 is not fully charged, the primary charge controller 150 will, through an intervening microcontroller, activate the switch 130 to prohibit recharge of the battery 160. This serves as a safeguard and prevents damage that might result from the effects of a supercapacitor 120 recharging a drained battery 160 as alluded to above.

The end result of this recharge balance along the primary route A is a battery 160 that is immediately and consistently "trickle" charged. That is, the switch 130 and the primary charge controller 150 work together to facilitate a circumstance where a battery 160 is continuously recharged. As a practical matter, current flow into the battery 160 from the supercapacitor 120 will roughly match the discharge rate into device electronics 170.

As detailed further below, this continuous balancing trickle of recharging will take place throughout most periods of any given typical day for a mobile device 300 employing the arrangement 100 (see FIG. 3). This is because, in most circumstances, the supercapacitor 120 and the battery 160 will begin each day fully charged and proceed from there with the supercapacitor 120 continuing to trickle charge the battery 160 throughout the day.

Note that the above-described governing balance maintained by the switch 130 and primary charge controller 150 means that potentially high current rate concerns from the use of the supercapacitor 120 are mitigated without the use of any resistors between the supercapacitor 120 and the device electronics 170. Thus, as indicated above, the arrangement 100 may be considered "resistor-free".

Continuing with reference to FIG. 1, it is worth noting that apart from the primary route A, charging of the battery 160 may take place through a more conventional secondary route B. Specifically, power from the external power source 110 may be routed to a secondary charge controller 180 for charging or recharging the battery 160. So, for example, where the supercapacitor 120 and the battery 160 have been depleted, they may both be charged over the course of a typical night at a bedside table as illustrated in FIG. 3. Of course, due to the described arrangement 100, it is often likely that a typical day's usage may not result in such depletion. Further, the overnight recharge is primarily directed at the battery 160 given that the supercapacitor 120 may attain a full charge in a matter of moments (e.g. well under about three minutes).

As indicated above, the battery 160 may be thought of more as a medium through which power is routed for the electronics 170. That is, in normal circumstances, the power is likely to be coming from a charged supercapacitor 120. This means that the battery 160 may be smaller than a typical both in terms of size and capacity. For example, in one embodiment, the battery 160 is a lithium ion package of less than about 500 mAh in capacity and may present a footprint of less than about 1.5 square inches. As a result, in spite of additional components, such as the supercapacitor 120, the arrangement 100 may ultimately take up no more space in a conventional smartphone or other electronic device than a more conventional arrangement. Of course, the battery 160 may be of any suitable type such as earth metal based with zinc (anode), manganese (cathode) and potassium.

Another advantage to the consistent trickle charging of the battery 160 is the fact that the battery 160 will rarely go through an entire life cycle. For example, barring a cross country flight or mere forgetfulness, a typical smartphone will be recharged frequently enough that the supercapacitor 120 supply of power along the primary route A as described will be the primary mode of supplying power to electronics 170. Thus, the battery 160 may rarely be fully depleted. As a result, the life of the battery 160 may be dramatically increased. That is, where a conventional smartphone battery might last for a few years before recommended replacement, a battery 160 utilized in the described arrangement 100 may be expected to have a battery life of more than ten years before recommended replacement. In keeping with the smartphone example, this means that it is probably more likely that a user would seek to replace the phone for performance, style or other reasons long before worrying about a need to change out the battery 160. Indeed, the same would likely hold true for other types of electronic devices utilizing the described arrangement.

Figure 2:
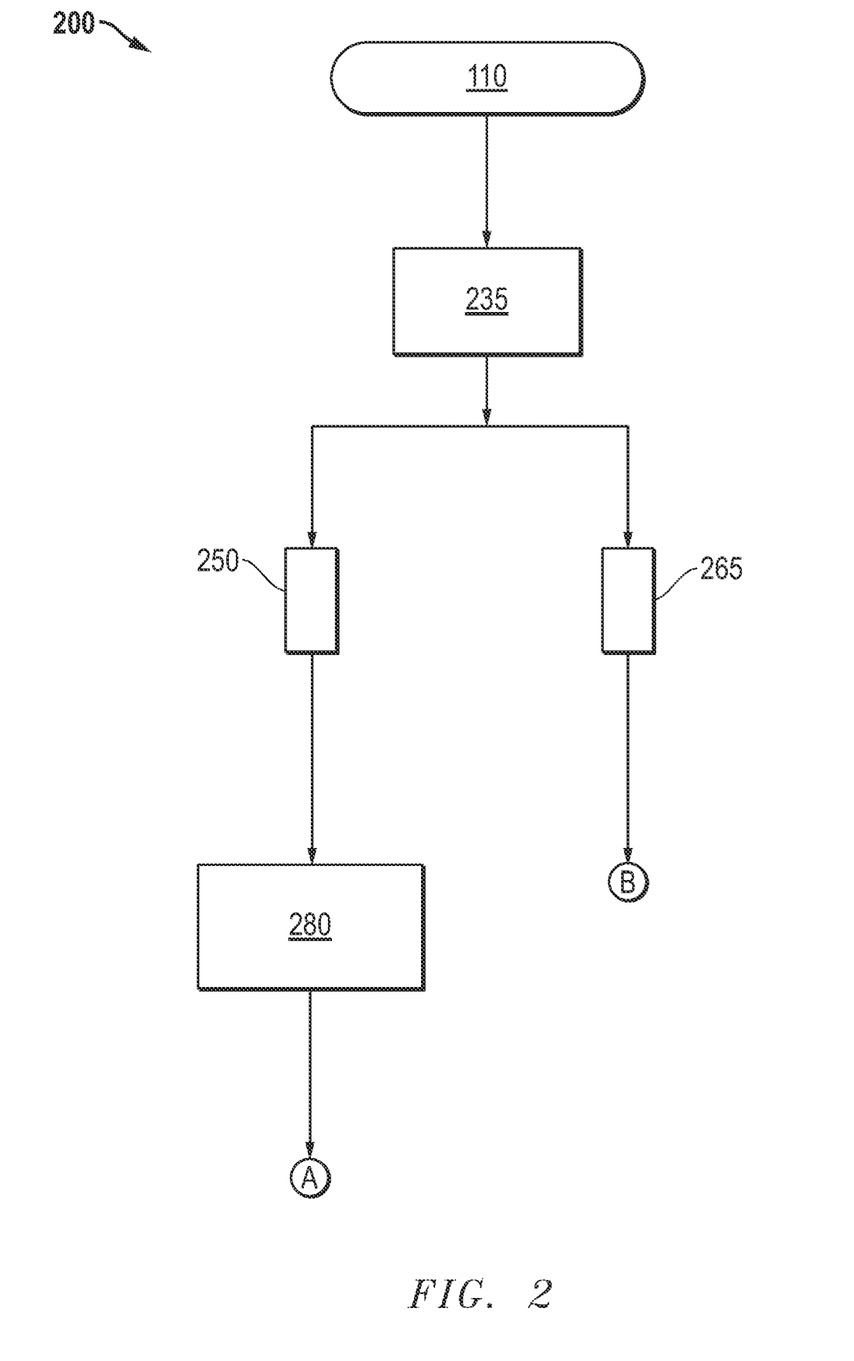
FIG. 2 is another schematic block diagram of an embodiment of the architecture of FIG. 1, illustrating added detail of power routed from an external power source.

Referring now to FIG. 2, another schematic block diagram of an embodiment of the architecture 100 of FIG. 1, is shown illustrating added arrangement 200 detail of power routed from the external power source 110. Specifically, as power is acquired from an external source 110 and before reaching either route (A or B), there may be additional electronic components employed. For example, the connection point of a device 300 as illustrated in FIG. 3 may include an AC-DC converter 235 that in turn routes the converted voltage to one of two resistors 250, 265 depending on the route (A or B). However, at this point, note that the resistors 250, 265 are located in advance of the supercapacitor 120 of FIG. 1. This means that they do not serve as a power drain on the supercapacitor 120. Instead, they may serve to mitigate charge rate which may be beneficial for personal electronic devices. Indeed, even with the presence of the specific resistor 250 to the primary route A, the supercapacitor 120 of FIG. 1 is likely to attain a full charge in substantially less than about 1 minute. Additionally, in the embodiment illustrated, a DC-DC converter 280 may also be found in advance of the supercapacitor 120 of FIG. 1 along the primary route A. This may account for the typical circumstance in which the supercapacitor 120 of FIG. 1 is of a different voltage than the battery 160. This is similar to the presence of the DC-DC converter 140 illustrated in FIG. 1 at the other side of the supercapacitor 120 along the primary route A.

Figure 3:
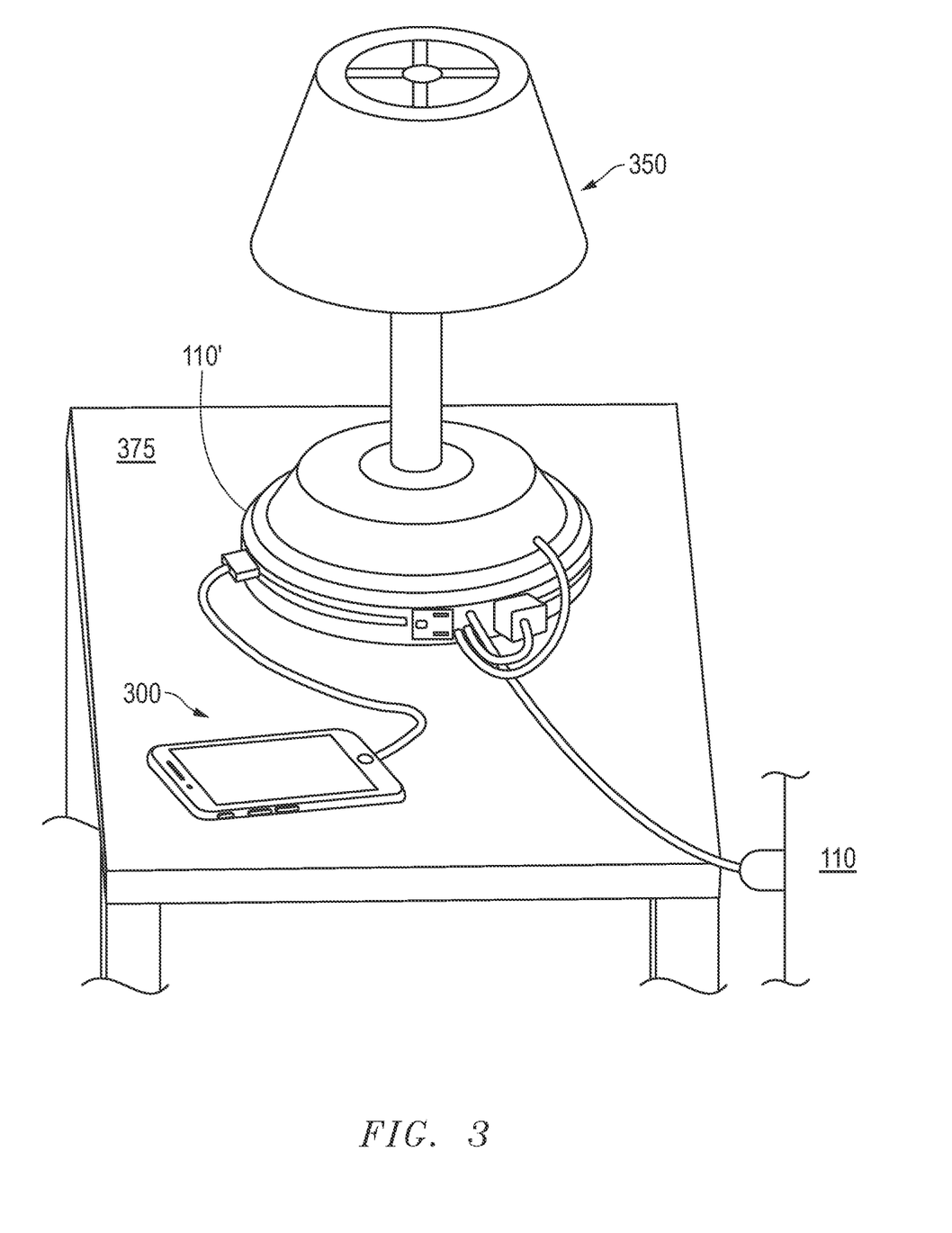
FIG. 3 is a perspective overview of an embodiment of the mobile device positioned for overnight recharge in a real-world environment.

Referring now to FIG. 3, a perspective overview of an embodiment of a mobile device 300 is shown positioned for overnight recharge in a real-world environment. The device 300 includes an architectural arrangement 100, 200 as detailed above. So, for example, with added reference to FIG. 1, at the end of the day, it is perhaps likely that the supercapacitor 120 is in need of recharge. For example, in one embodiment, the supercapacitor 120 has a daily life of between about 4 and 7 hours. Of course, in circumstances where the supercapacitor 120 is not yet in need of recharge, the battery 160 remains fully charged.

Recharge of the device 300 at the nightstand 375 is attained through an external power source 110, 110'. This may be thought of as the wall outlet 110 as alluded to above. Although, in the embodiment shown, recharge is routed through a lamp 350 at an alternate outlet location 110'. Regardless, with added reference to FIG. 1, as soon as it is plugged in, recharge of the drained device 300 may proceed in circumstances where the supercapacitor 120 is in need of recharge. With reference to the discussion above, this means that the supercapacitor 120 attains a full charge in a matter of moments. By the same token, the battery 160 may be simultaneously charged along the secondary route B. Of course, once the battery 160 is fully charged, trickle charging thereof, along the primary route A may proceed as described above.

Returning to reference to FIG. 1, in one embodiment, powering of device electronics 170 from the battery 160 is more indirect and not routed through the more direct route 165 illustrated. Instead, power is routed through a secondary switch 131. This secondary switch 131 will disconnect the battery 160 from the device electronics 170 when the supercapacitor 120 voltage drops to a predetermined level requiring recharged (e.g., less than about 10%). Once the supercapacitor 120 is recharged it can be immediately connected through the switch 130 to the battery 160, since the battery 160 will still be fully charged (e.g. at substantially 100%).

Figure 4A:
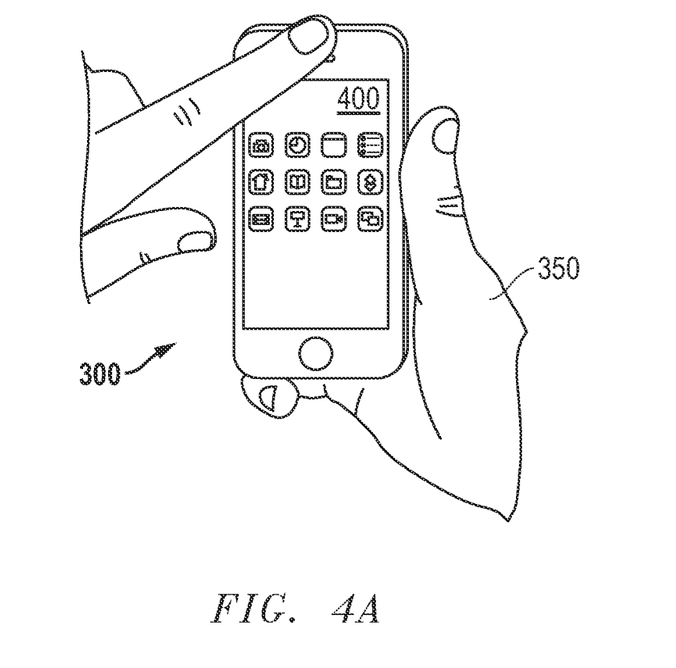
FIG. 4A is a perspective view of the mobile device of FIG. 3 utilized throughout a day.

Referring now to FIG. 4A, a perspective view of the mobile device 300 of FIG. 3 is shown utilized throughout a day. Specifically, a user 350 is shown interfacing with a screen 400 of the device 300. Thus, device electronics 170 are in operation, powered through the battery 160 of the arrangement 100 of FIG. 1. Over time, this means that the battery 160 will continue to be trickle charged for a period until the supercapacitor 120 of the arrangement 100 has been fully drained.

Figure 4B:
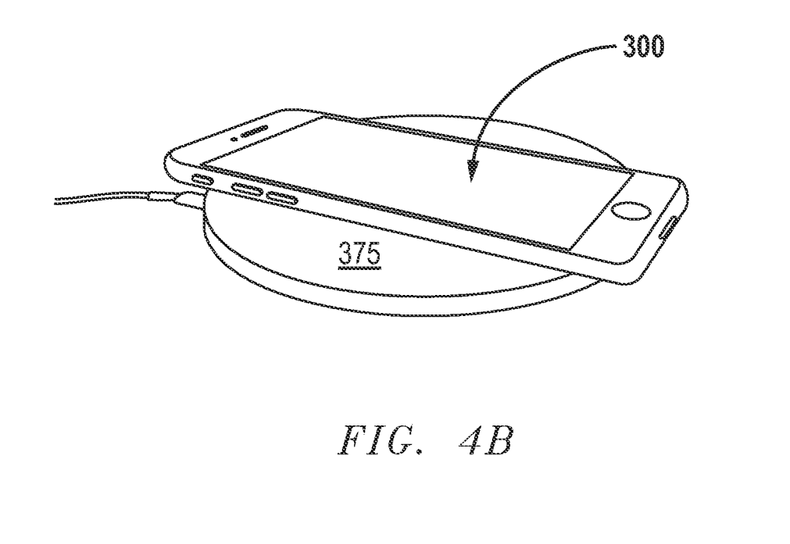
FIG. 4B is a perspective view of the mobile device of FIG. 4A placed in a quick charge location following the day use.

Referring now to FIG. 4B, a perspective view of the mobile device 300 of FIG. 4A is shown placed in a quick charge location 375 following the day's use. For example, consider the above hypothetical international flight scenario where the supercapacitor 120 of FIG. 1 has been fully drained. The user may simply reach a table at the arrival gate where a charge location 375 is provided, drop the device 300 in place for a few moments and attain more than sufficient charge to the supercapacitor 120 to continue using the device 300 for several more hours, uninterrupted. The traveling user need not rush to the hotel or other likely plug-in location to recharge the device for a period of an hour or more in order to have a fully charged device 300.

Figure 5:
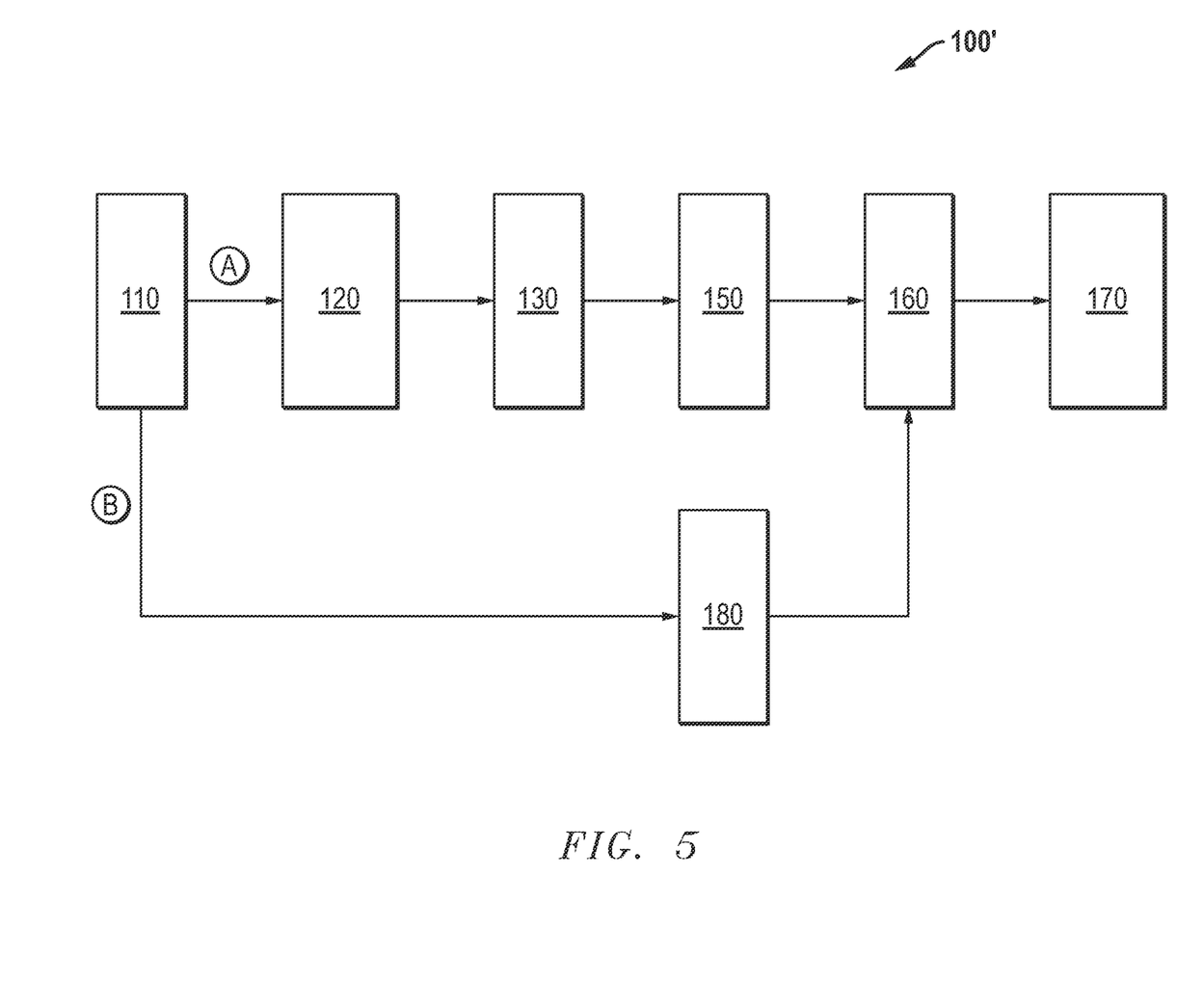
FIG. 5 is a schematic block diagram of an alternate embodiment of mobile device powering architecture that allows for efficient utilization of a supercapacitor.

Referring now to FIG. 5, a schematic block diagram of an alternate embodiment of mobile device powering architecture 100' is illustrated that allows for efficient utilization of a supercapacitor 120. Again, in spite of the potential for a large discharge rate from the supercapacitor 120, the architectural arrangement 100' remains resistor-free between the supercapacitor 120 and the battery 160. The supercapacitor 120 is charged from an external power source 110 and supplies power along the primary route A. Similarly, the battery 160 is again initially recharged along the secondary route B and eventually again serves as a medium for ultimately supplying power to device electronics 170.

As with the embodiment of FIG. 1, a switch 130 is utilized whether or not to supply power along the route A to the battery 160. Further, when allowed, a trickle type of recharge is regulated by a primary charge controller 150. Thus, a unique balance of power to the battery 160 is maintained in a manner that does not subject device electronics 170 to potential harm due to current rate from a supercapacitor 120. For the particular embodiment of FIG. 5, a DC-DC converter 140 as shown in FIG. 1 is not utilized. This would be an option where the supercapacitor 120 is already of the same voltage type as the battery.

Figure 6:
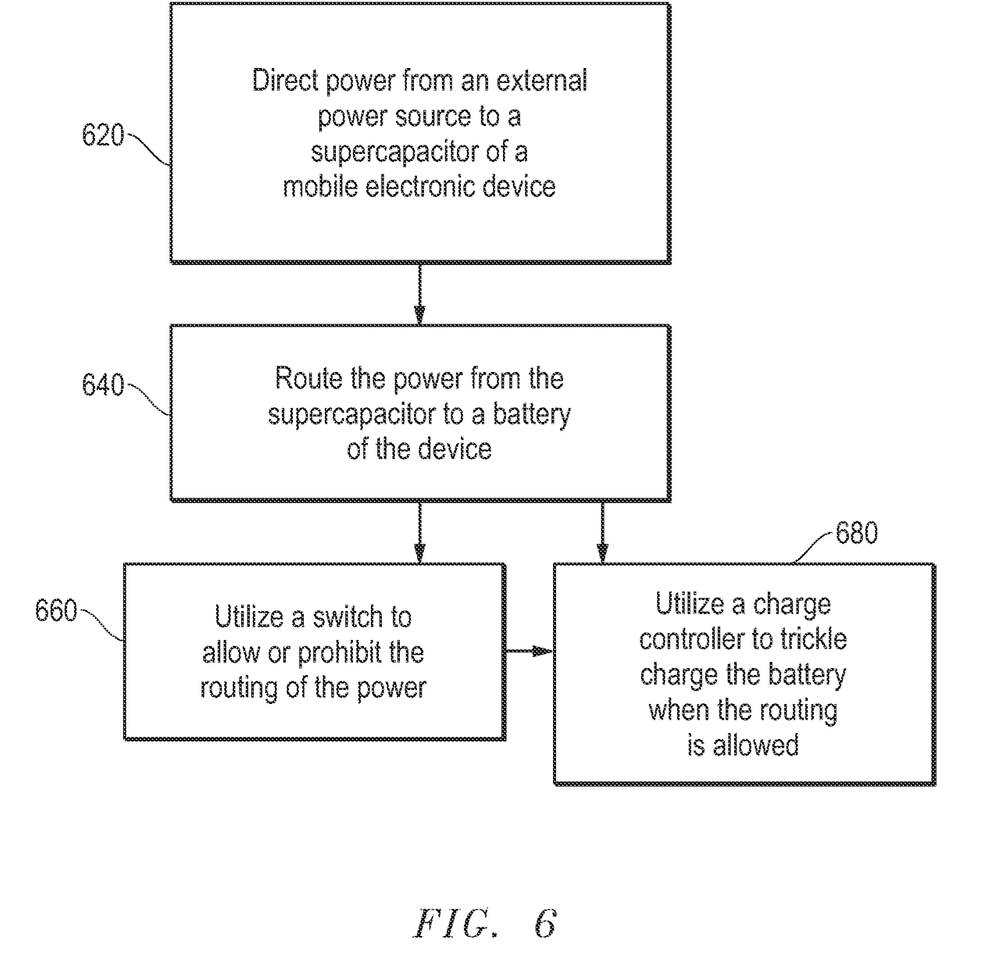
FIG. 6 is a flow-chart summarizing an embodiment of a method of employing a mobile device powering architecture with a supercapacitor.

Referring now to FIG. 6, a flow-chart summarizing an embodiment of a method of employing a mobile device powering architecture with a supercapacitor is shown. Namely, as indicated at 620, a supercapacitor of a mobile device obtains power from a conventional external source which is routed to a battery of the device (see 640). In order for this to be a beneficial and practical undertaking in light of associated device electronics, a switch is utilized to allow or prohibit this routing of the power to the battery as indicated at 660. In addition to the switch, for circumstances in which the switch allows supercapacitor recharge of the battery, a charge controller is utilized to trickle charge the battery (see 680).

Embodiments described hereinabove include electronic architectural arrangements that allow for the practical use of a supercapacitor with mobile devices for sake of powering electronics. Further, in spite of the generally fast discharge rate from supercapacitors, the embodiments of these arrangements do not require the utilization of resistors as a safeguard between the supercapacitor and device electronics. Thus, advantageous charging and recharging benefits of a supercapacitor may be realized without compromise to long term device performance.

The preceding description has been presented with reference to presently preferred embodiments. Persons skilled in the art and technology to which these embodiments pertain will appreciate that alterations and changes in the described structures and methods of operation may be practiced without meaningfully departing from the principle, and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A method of powering a mobile device, the method comprising:
    directing power from an external power source to a fast charge and discharge power source of the device;
    routing power from the fast charge and discharge power source to a rechargeable battery of the device in a resistor-free manner, the routing comprising:
        employing a switch to allow the routing when the battery is fully charged; and
        ceasing the routing when the battery is not fully charged.

2. The method of claim 1 wherein the employing of the charge controller to keep the power to the battery within a predetermined limit depending on the charge level of the battery results in a substantially continuous trickle charging of the battery from the fast charge and discharge power source.

3. The method of claim 1 further comprising directing power from the external power source to the battery along a secondary route absent the fast charge and discharge power source.

4. The method of claim 1 wherein the switch is a first switch, the method further comprising employing a secondary switch to disconnect the battery from device electronics when the fast charge and discharge power source is of a power level that is below a predetermined level.

5. The method of claim 1 comprising powering device electronics of the device with the battery as a storage medium through which power from the fast charge and discharge power source is directed.

6. The method of claim 5 wherein the routing of the power to the battery substantially matches the routing of power to the device electronics.

7. The method of claim 5 wherein the battery substantially avoids undergoing a life cycle.

8. The method of claim 7 wherein the battery maintains a substantially full charge level so long as the fast charge and discharge power source retains charge.

9. A resistor-free fast charge and discharge power source mobile device electronic arrangement comprising:
    a fast charge and discharge power source of the mobile device;
    a battery electronically coupled to the fast charge and discharge power source;
    a switch between the battery and the fast charge and discharge power source to govern whether the fast charge and discharge power source is allowed to route power to the battery; and
    a charge controller to maintain a trickle charge of power to the battery from the fast charge and discharge power source when the switch allows power to the battery, the trickle charge of power to the battery substantially the same as power from the battery to device electronics of the mobile device.

10. The arrangement of claim 9 wherein the battery is one of lithium ion and earth metal based.

11. The arrangement of claim 9 wherein the battery includes a capacity of less than about 500 mAh.

12. The arrangement of claim 9 wherein the battery has a replacement life in excess of ten years.

13. The arrangement of claim 9 further comprising a DC-DC converter electrically between the fast charge and discharge power source and the battery.

14. The arrangement of claim 9 wherein the fast charge and discharge power source obtains the power from an external power source.

15. The arrangement of claim 14 wherein the battery is also electronically coupled to the external power source along a route absent the fast charge and discharge power source.

16. The arrangement of claim 14 wherein once charged, the fast charge and discharge power source has a daily life of between about 4 and 7 hours.

17. The arrangement of claim 14 wherein the mobile device comprises a connection point for connecting to the external power source, the device comprising one of an AC-DC converter, a resistor and a DC-DC converter between the connection point and the fast charge and discharge power source.

18. A mobile device with an electronic powering architecture comprising
    a fast charge and discharge power source of the mobile device;
    a battery electronically coupled to the fast charge and discharge power source;
    a switch between the battery and the fast charge and discharge power source to govern whether the fast charge and discharge power source is allowed to route power to the battery; and
    a charge controller to maintain a trickle charge of power to the battery from the fast charge and discharge power source when the switch allows power to the battery, the trickle charge of power to the battery substantially the same as power from the battery to device electronics of the mobile device.

19. The mobile device of claim 18 selected from a group consisting of a smartphone, a mobile phone, a smart watch, a wireless earpiece, a tablet, a sensor, an alarm and a laptop.

20. The mobile device of claim 18 wherein the battery includes a capacity of less than about 500 mAh and the mobile device has a daily power life in excess of 12 hours.

* * * * *